United States Patent [19]

Aoki et al.

[11] Patent Number: 5,076,976
[45] Date of Patent: Dec. 31, 1991

[54] PROCESS FOR PRODUCING POLYESTER FILM

[75] Inventors: Seizo Aoki, Shiga; Kenji Tsunashima, Kyoto; Tetsuo Ikegami, Otsu; Seiya Sugiura, Otsu; Morishige Sonoda, Otsu; Yukio Ota, Kyoto, all of Japan

[73] Assignee: Toray Industries, Inc., Tokyo, Japan

[21] Appl. No.: 455,399

[22] PCT Filed: Jun. 23, 1989

[86] PCT No.: PCT/JP89/00625
§ 371 Date: Feb. 23, 1990
§ 102(e) Date: Feb. 23, 1990

[87] PCT Pub. No.: WO89/12544
PCT Pub. Date: Dec. 28, 1989

[30] Foreign Application Priority Data

Jun. 23, 1988 [JP] Japan .................. 63-155800
Sep. 19, 1988 [JP] Japan .................. 63-234332
Mar. 9, 1989 [JP] Japan .................. 1-58243

[51] Int. Cl.⁵ ........................................ B29D 7/01
[52] U.S. Cl. ................................ 264/22; 264/210.7; 264/216; 264/288.4
[58] Field of Search .............. 264/288.4, 210.7, 216, 264/290.2, DIG. 73, 22

[56] References Cited

U.S. PATENT DOCUMENTS

| | | | |
|---|---|---|---|
| 2,767,435 | 10/1956 | Alles | 264/288.4 |
| 2,779,684 | 1/1957 | Alles | 264/290.2 |
| 2,823,421 | 2/1958 | Scarlett | 264/DIG. 73 |
| 3,515,778 | 6/1970 | Fields et al. | 264/216 |
| 4,148,851 | 4/1979 | Tani et al. | 264/216 |
| 4,370,291 | 1/1983 | Kazama et al. | 264/210.7 |
| 4,534,918 | 8/1985 | Forrest. Jr. | 264/216 |

FOREIGN PATENT DOCUMENTS

| | | |
|---|---|---|
| 37-6142 | 6/1962 | Japan . |
| 38-23489 | 11/1963 | Japan . |
| 48-29311 | 9/1973 | Japan . |
| 52-10909 | 3/1977 | Japan . |
| 52-33666 | 8/1977 | Japan . |
| 58-35133 | 8/1983 | Japan . |
| 1140175 | 3/1967 | United Kingdom . |

Primary Examiner—James Lowe
Attorney, Agent, or Firm—Birch, Stewart, Kolasch, & Birch

[57] ABSTRACT

A molten polyester sheet is solidified by cooling it on the surface of a mobile cooling medium on which a water film has been formed. The sheet is stretched at least 4.5-fold in overall stretching ratio in a longitudinal direction through a plurality of stretching steps. Since casting is conducted via the water film, water is absorbed in the surface layer and the interior of the cast sheet, thus facilitating orientation by stretching in the longitudinal direction and lowering the stretching temperature. As a result, stretching with a high stretching ratio can be attained by multi-stage stretching without conducting high-temperature stretching. Thus, this process can accelerate film formation, improve productivity, and provide a film having reduced unevenness in thickness, less surface roughness and excellent abrasion resistance.

13 Claims, 6 Drawing Sheets

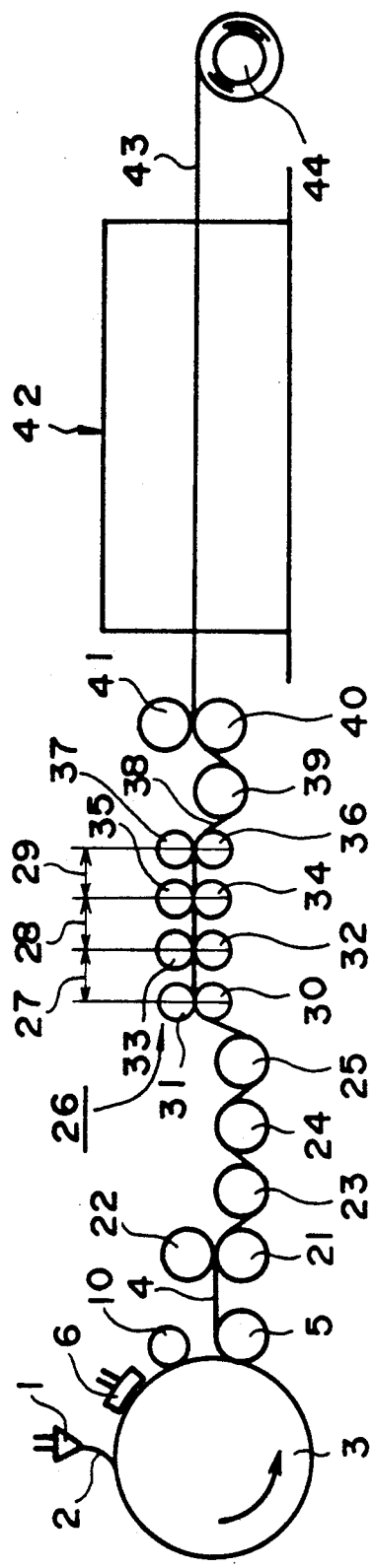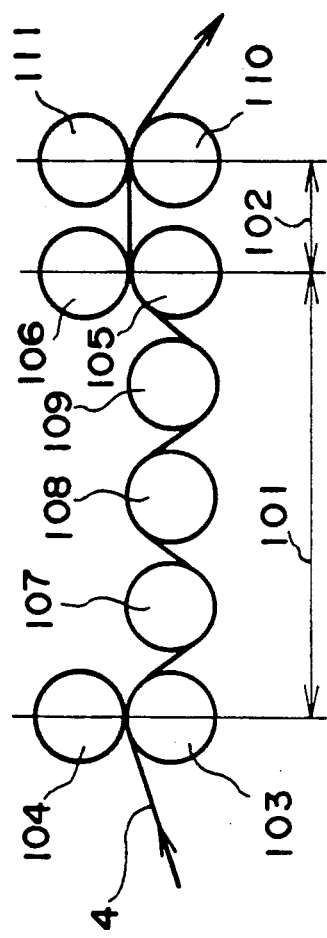

PROCESS FOR PRODUCING POLYESTER FILM

TECHNICAL FIELD OF THE INVENTION

The present invention relates to a process for producing a polyester film, more specifically to a process for producing a polyester film wherein a molten polyester sheet is solidified by cooling and the sheet is stretched in its longitudinal direction.

BACKGROUND ART OF THE INVENTION

A polyester film is produced, generally, by casting a molten polyester sheet, delivered from a die onto the surface of a mobile cooling medium that is continuously moving so as to solidify the molten polyester sheet by cooling, heating the solidified sheet and stretching the sheet in its longitudinal direction. The film stretched in the longitudinal direction is a uniaxially stretched film. If the film is further stretched in its transverse direction, after stretching it in the longitudinal direction, a biaxially stretched film can be obtained.

As high-speed film forming techniques in the production of polyester film, a method for increasing the casting speed by casting a molten polyester sheet onto the surface of a mobile cooling medium having a liquid layer, such as a water layer on the surface, and a method for increasing a longitudinal draw ratio by stretching a sheet in its longitudinal direction through a plurality of stretching steps not less than two steps, are individually known, respectively.

The former method is disclosed in, for example, U.K. Patent 1,140,175 and JP-B-SHO-58-35133.

However, there exists a limit to the increase in the film forming speed after the longitudinal stretching of a sheet only by cooling and solidifying a molten polyester sheet on the surface of a mobile cooling medium having a liquid layer on the surface. Moreover, in this casting process, it is important to form a uniform liquid layer on the surface of a mobile cooling medium and interpose the formed liquid layer uniformly between the surface of the mobile cooling medium and the molten polyester sheet. If the liquid layer is not uniformly formed or interposed, it causes the cooled and solidified sheet to have surface defects.

The latter method, i.e. the method for stretching a polyester sheet in its longitudinal direction with a high stretching ratio through a plurality of stretching steps, is disclosed in, for example, JP-B-SHO-52-10909 and JP-B-SHO-52-33666. These publications teach a process for stretching a polyester sheet at a total draw ratio of not less than 4.5 times the original length by multi-stage stretching comprising a high-temperature stretching process and a low-temperature stretching process. Since this multi-stage stretching can achieve a high longitudinal draw ratio, such as a ratio of about two times of 2.5-3.5-fold which is disclosed in JP-B-SHO-38-23489 etc., or a ratio higher than that value such as 5-9 times, high-speed film formation process can be attained, including speeds at greater than 200 m/min.

In this multi-stage stretching, however, it is necessary to increase the stretching temperature in comparison with a usual stretching temperature of 80°-95° C. in order to ensure a high longitudinal draw ratio. Therefore, in this stretching process, problems are liable to occur such as (1) the thickness variation of the film obtained deteriorates because the draw ratio is likely to disperse, (2) the surface of the film obtained becomes rough because the film is likely to adhere to a high-temperature stretching roll, and (3) the abrasion resistance of the surface of the film finally obtained decreases because the degree of crystallinity of the film increases and the surface layer of the film is likely to be abraded. Moreover, because the polyester sheet (or film) is stretched at a high temperature, an oligomer precipitates from the sheet. The precipitated oligomer soils the surface of a stretching roll in a short period of time. If the surface of the stretching roll is soiled, surface defects occur on the obtained film, and the productivity of the film is greatly decreased as the soiled roll must be cleaned or exchanged. Furthermore, in this conventional multi-stage stretching, if the film is stretched at a total draw ratio of not less than 4.5 times the original length at a temperature of 80°-95° C. which is a usual stretching temperature, the film formation is not stable and quality defects are caused such as a rough surface and degraded transparency.

SUMMARY OF THE INVENTION

An object of the present invention is to provide a process for producing a polyester film which can form a high-quality polyester film at a high speed with a stable productivity.

Another object of the present invention is to provide a process for producing a polyester film which can suppress the thickness variation and the surface roughness of an obtained film to small extents, can obtain a film surface having a high abrasion resistance, and can achieve an excellent productivity without soiling stretching rolls, when the film is stretched at a total draw ratio of at least 4.5 times the original length in its longitudinal direction through a plurality of stretching steps in order to achieve the above high speed film formation.

To accomplish the above objects, a process for producing a polyester film according to the present invention comprises a process wherein, after a molten polyester sheet is solidified by cooling it on the surface of a mobile cooling medium on which a water layer is formed, the sheet is stretched at a total draw ratio of at least 4.5 times the original length in its longitudinal direction through a plurality of stretching steps.

In the present invention, "polyester" is a generic term of a polymer which can be obtained by the condensation polymerization of glycol and dicarboxylic acid and which has an ester bond in its principal chain. Typical glycols are ethylene glycol, butanediolhexylene glycol, cyclohexanedimethanol and neopentyl glycol etc., and typical dicarboxylic acids are terephthalic acid, isophthalic acid, phthalic acid, naphthalenedicarboxylic acid, diphenyldicarboxylic acid, cyclohexanedicarboxylic acid, adipic acid, sebacic acid, dodecanedicarboxylic acid, dimer acid and eicosanic acid etc.

Typical polyesters are polyethylene terephthalate, polybutylene terephthalate, polyethylene naphthalate and polycyclohexylenedimethylene terephthalate etc. Particularly polyethylene terephthalate is preferable.

To such a polyester, a generally used additive, for example, stabilizer, viscosity conditioner, oxidation inhibitor, filler, slipping agent, antistatic agent, antiblocking agent and mold releasing agent etc., may be added by the volume which does not substantially decrease the effect according to the present invention.

In the process according to the present invention, a molten polyester sheet is solidified by cooling on the surface of a mobile cooling medium on which a water layer is formed. Although a cylindrical cooling drum is usually used as the mobile cooling medium, the mobile cooling medium may be constructed from a circulated belt having a plain surface. Namely, a mobile cooling medium has a cooling surface which can move continuously. After the molten polyester sheet is cast onto the surface of the mobile cooling medium, the molten polyester sheet is cooled and solidified while moving together with the surface of the cooling medium. The solidified sheet is then continuously sent to the next process.

The water layer is formed by supplying water to the surface of the mobile cooling medium. The molten polyester sheet is cast onto the surface of the mobile cooling medium on which the water layer is formed. The sheet is cooled and solidified while moving together with the surface of the cooling medium in such a state wherein the water layer is interposed between the sheet and the surface of the cooling medium.

In this cooling and solidifying step of the molten polyester sheet, preferably an electrostatic charge is applied to the molten sheet. For example, JP-B-SHO-37-6142 or JP-B-SHO-48-29311 discloses an electrostatic casting method. The contact state between the molten sheet and the cooling medium can be improved by continuously applying an electrostatic charge to the molten sheet using such a casting method. This conventional electrostatic casting method sometimes cannot be used depending upon the kind of polymerization catalyst or additives in the polyester. In the present invention, however, since a water layer is interposed between the sheet and the surface of the cooling medium, the electrostatic casting method can be employed even with these types of polyesters. By use of the electrostatic casting method, the intimate contact between the molten polyester sheet and the surface of the cooling medium can be obtained. Moreover a uniform meniscus portion (described later) can be formed because the contact line which extends in the transverse direction of the sheet at a position where the molten polyester sheet comes into contact with the surface of the cooling medium, can be defined as a substantially straight line.

As the method for forming a water layer on the surface of the mobile cooling medium, there is a method wherein air containing water vapor (moisture) is blown onto the surface of the cooling medium, which is controlled at a temperature lower than the dew point of the water vapor, and the water vapor is bedewed on the surface of the cooling medium (bedewing method); a method wherein water is applied to the surface of the cooling medium by a seepage roller or a transfer roller; and a method wherein water vapor charged with static electricity is sprayed onto the surface of the cooling medium. The bedewing method is desirable in the present invention because the water layer should be formed preferably thinner in the present invention. It is not necessary that the water layer be in the form of a continuous layer when it is applied to the surface of the cooling medium. That is, the water layer may be applied in the form of discontinuous water drops such as dew drops.

In the process according to the present invention, a required water layer is formed on the surface of the cooling medium at of the position ahead a position where the molten polyester sheet comes into contact with the surface of the cooling medium. The water layer formed on the surface of the cooling medium continuously reaches the position where the molten polyester sheet comes into contact with the surface of the cooling medium, associated with the movement of the surface of the cooling medium. In this position, the amount of the water continuously conveyed into the position by the moving surface of the cooling medium and the amount of the water continuously conveyed out from the position and sandwiched between the sheet and the surface of the cooling medium are balanced, and therefore, a particular state is presented as if a constant amount of water is retained at the position. In this quasi-retention water area, a meniscus phenomenon (phenomenon that the free surface of a liquid curves by its surface tension) happens between the surface of the molten polyester sheet immediately before coming into contact with the surface of the cooling medium and the surface of the cooling medium. At the same time, the quasi-retention water extends continuously in the transverse direction of the sheet substantially over the entire width of the sheet, along the line at which the molten polyester sheet comes into contact with the surface of the cooling medium. In the present invention, this quasi-retention water portion where the meniscus phenomenon happens is called the "meniscus portion". Even though the water layer is formed as discontinuous water drops on the surface of the mobile cooling medium before reaching the meniscus portion, the state of water drops is dissolved when the water drops reach the meniscus portion because the water drops are absorbed in the meniscus portion. Therefore, the water layer formed is continuously conveyed out from the meniscus portion as a uniform and continuous water layer interposed between the molten polyester sheet and the surface of the cooling medium. However, the water layer flowing into the meniscus portion must be formed so as to prevent (1) interruption of the meniscus portion, (2) fluctuation of the size of the meniscus portion and (3) the water layer, to be flown into the meniscus portion, from directly coming into contact with the molten polyester sheet. The entrapment of air from the meniscus portion into the portion between the molten polyester sheet and the surface of the cooling medium can be prevented by forming a stable meniscus portion without fluctuation.

The relationship between the height "h" of the meniscus portion from the surface of the cooling medium and the average thickness "d" of the water layer formed on the surface of the cooling medium at a position ahead of the meniscus portion is preferably such that $h > d$. If the relationship is $h \leq d$, the fluctuation of the thickness of the water layer is transferred to the surface of the molten polyester sheet as it is, the surface of the sheet is liable to become an irregular surface like an orange peel and it becomes difficult to maintain a stable casting for a long time.

This height h of the meniscus portion can be easily controlled in accordance with the surface tension of the polymer of the molten polyester sheet, the surface roughness of the molten sheet, the thickness of the molten sheet, the surface roughness and surface tension of the cooling drum, adhesion means such a electrostatic casting, the distance between the die delivering the molten sheet and the surface of the cooling medium, and the angle of the molten sheet at the position where the sheet comes into contact with the surface of the cooling medium etc.

The method for forming the water layer on the surface of the cooling medium is preferably a bedewing method from the viewpoint that a uniform and thin water layer is required in the present invention. It is difficult to form a uniform water layer by other methods. Since the water layer can be sufficiently cooled by the cooling medium before it reaches the meniscus portion as long as the water layer is formed as a uniform and thin layer, the boiling of the water can be prevented when the water layer reaches the position of the molten polyester sheet. If the boiling of the water occurs, the surface of the polyester sheet becomes irregular and this is not desirable.

The maximum diameter of dew drops formed on the surface of the cooling medium by the bedewing method is not greater than 70 $\mu$m, preferably not greater than 50 $\mu$m. When the diameter is greater than 70 $\mu$m, irregularity defect occurs on the surface of the sheet.

The number of the water drops is preferably not less than 50/0.1 mm$^2$, more preferably not less than 70/0.1 mm$^2$. When the number is less than 50/0.1 mm$^2$, entrapment of air is liable to occur, due to the water, that in turn cause surface defects of the sheet.

The surface roughness of the cooling medium according to the present invention is preferably not greater than 0.04 $\mu$m in center line average height Ra. If the surface roughness is greater than 0.04 $\mu$m, the surface of the sheet becomes too rough, it becomes difficult to conduct the water elimination described later, and the surface defects of the sheet due to water drops are likely to occur. This is because the diameter of the water drops becomes difficult to be suppressed to not greater than 70 $\mu$m. The maximum surface roughness Rt is preferably not greater than 0.4 $\mu$m.

To form such a specified water layer precisely, it is necessary that a required amount of water is newly supplied by a water supply means to form the required water layer, after the residual water remaining on the surface of the cooling medium is eliminated by a water eliminating means at a position after the sheet leaves the surface of the cooling medium. Since the residual water is left on the surface of the cooling medium as relatively large scattered island-like water, it is difficult to form the required water layer if such island-like water remains. As methods for eliminating the residual water, there is a method for eliminating the water by an air suction roll on which a nonwoven fabric having moisture absorption properties is provided (described later), a method for blowing off the water by an air knife, a method of combining both methods, and a method for blowing air by a non-contact air knife and sucking water by another air knife. However, the water elimination method is not particularly restricted.

The method for forming a water layer after eliminating the residual water is preferably a bedewing method as aforementioned. The diameter of water drops included in the air containing water vapor or moisture and to be supplied to the surface of the cooling medium must be also suppressed to a small diameter in order to suppress the diameter of dew drops on the cooling medium. The water vapor having such a small water drop diameter may be obtained, for example, by introducing air into the water contained in a tank, bubbling the water by the introduced air, and introducing the air including water vapor generated by the bubbling to the surface of the cooling medium. Of course, other methods are available.

In the process according to the present invention, side portions of the water layer are formed preferably thicker than the central portion in the transverse direction of the sheet when the water layer is formed on the surface of the cooling medium. Although the condition depends on the kind and thickness of the sheet, if the thickness of the water layer in its side portions is equal to or smaller than that in its central portion, the flatness of the film after casting deteriorates and the thickness variation of the film deteriorates, thereby decreasing the quality and the productivity.

The side portion of the water layer in which the water layer is thickened preferably extends not more than 200 mm from each sheet edge in the transverse direction of the sheet, more preferably not more than 150 mm from the sheet edge. If the area is greater than 200 mm from the sheet edge, the flatness of the sheet deteriorates.

Moreover, the water layer is preferably formed also in the area outside of the sheet edge in the transverse direction of the sheet in which the sheet does not exist, with a width of not less than 5 mm and a thickness similar to the thickness of the inside portion. By such a formation of the water layer, the water near the sheet end portion can be prevented from completely evaporating by heat transfer from the sheet end portion. The flatness of the sheet can thus be better maintained and the curling up of the sheet end portion can be prevented.

The method for forming the water layer having the larger thickness in the sheet end area may be a method for varying the amount of water supplied by a single water supply means in the transverse direction of the sheet or a method for providing an additional water supply means and supplying the water for the sheet end area from the additional water supply means.

In the process according to the present invention, the anti-cooling medium-side surface of the sheet is preferably cooled at its end portions in the transverse direction of the sheet. Although the condition depends on the kind and thickness of the sheet, if this cooling is not conducted, the sheet end portion is likely to curl up, the flatness of the sheet end portion is likely to deteriorate and even cracks of the sheet end portion are likely to occur. Therefore, stable film formation sometimes cannot be achieved. When the cooling is conducted, however, the crystallization of the anti-cooling medium-side surface of the sheet end portions is prevented by the cooling and the sheet end portions are rapidly solidified. Accordingly, the curling up etc. of the sheet end portions can be prevented.

As a method for this cooling, either a method for disposing nozzles densely in the sheet delivering direction and continuously cooling the sheet end portions by discharging cooling air or water out from the nozzles along the sheet end portions or a method for bringing a nonwoven fabric etc. into contact with the sheet end portions and cooling the sheet end portions by cooling water supplied through the fabric, can be applied. However, other methods may be applied. The cooling by water is more preferable than the cooling by air from the viewpoint of cooling efficiency. A method for cooling the sheet end portions by continuous water layer until the temperature of the sheet reaches a temperature of not higher than the glass transition temperature Tg+20° C.) is preferable from the viewpoints of preventing the flatness of the sheet end portions from deteriorating and preventing the sheet end portions from cracking.

Further, the area of this cooling is preferably an area not less than 10 mm from the sheet edges in the transverse direction of the sheet and can cool the sheet edge surfaces perpendicular to the surface of the cooling medium and the portions of the surface of the cooling medium outside of the sheet edges up to a position far of not less than 5 mm from the sheet edges in the transverse direction of the sheet. Such a cooling arrangement is advantageous in preventing the flatness of the sheet end portions from deteriorating and preventing the sheet end portions from cracking.

In the process according to the present invention, the polyester sheet solidified by cooling as described hereinabove is stretched at a total draw ratio of at least 4.5 times the original length in its longitudinal direction through a plurality of stretching steps.

In the above casting according to the present invention, while the molten polyester sheet is solidified by cooling, the water on the surface of the cooling medium is absorbed in the surface layer and the interior of the polyester sheet itself, and thereafter, the sheet is sent to a longitudinal stretching process. In the longitudinal stretching process, the orientation of the sheet due to the stretching can be easily performed because the sheet contains water. Therefore, the stretching temperature of the process can be reduced. As a result, multi-stage stretching with a high draw ratio can be possible without conducting high-temperature stretching, and film having a small thickness variation, less surface roughness and excellent abrasion resistance can be obtained.

The method for multi-stage longitudinal stretching according to the present invention is not particularly restricted. As typical methods, there are a method wherein each stretching step is conducted between an upstream drive stretching roll and a downstream drive stretching roll which are disposed adjacent to each other in the sheet running direction, at least one stretching step at a temperature of not higher than the yield point is conducted at an upstream side position, and thereafter, the final stretching step is conducted as a usual stretching at a temperature higher than the yield point, and a method wherein the stretching with a low stretching speed is conducted at a draw ratio of about 2 times, and thereafter, the final stretching step is conducted so as to reach a target draw ratio. The latter method will be explained more concretely. The method is, for example, a method wherein the final stretching step is conducted between an upstream drive stretching roll and a downstream drive stretching roll which are disposed adjacent to each other in the sheet running direction, and stretching steps upstream of the final stretching step in the sheet running direction are conducted between an upstream drive stretching roll and a downstream drive stretching roll, which are disposed in the sheet running direction, via free stretching rolls which are disposed between the drive stretching rolls. In this method, the stretching speed in the upstream side stage is preferably as low as possible, for example, not greater than 10,000%/min. In any method described in the above, the final total draw ratio is set to a ratio of not less than 4.5 times the original length.

In the multi-stage stretching according to the present invention, the draw ratio of each stretching step is preferably at least 1.1 times, more preferably at least 1.3 times, further more preferably at least 1.5 times and still further more preferably at least 2.0 times. If the draw ratio is less than 1.1 times, the thickness variation of the film deteriorates, the roughness of the film surface increases and the abrasion resistance of the film surface decreases. Moreover in this multi-stage stretching, it is preferable that the draw ratio of the first stretching step is the lowest ratio among the plurality of draw ratios and other draw ratios become higher in order in successive stretching steps, from the viewpoint of preventing the thickness variation from deteriorating. If the draw ratio of a stretching step is higher than that of the next stretching step, the thickness variation deteriorates. If the thickness variation becomes too bad, film breakage occurs and stable film formation cannot be attained.

In the process for producing a polyester film described hereinabove according to the present invention, the producing speed of the cooled and solidified sheet can be increased in the casting process as well as the sheet with a high quality can be obtained by the casting method for interposing a required water layer, and in the longitudinal stretching process, the stretching temperature can be lowered because the sheet absorbing water is stretched, and stretching with a high draw ratio can be attained by the multi-stage stretching without a high-temperature stretching step. As a result, a film having reduced thickness variation, less roughness of the surface and excellent abrasion resistance of the surface can be obtained as well as the film forming speed can be greatly increased. Moreover, because high-temperature stretching is not necessary, stretching rolls can be prevented from soiling, thereby improving productivity of the film greatly.

It is evident that the longitudinally stretched film thus obtained may be stretched in its transverse direction and/or heat treated as needed. Particularly, when the longitudinally stretched film according to the present invention is stretched in the transverse direction, a biaxially stretched film having a low thickness variation, a high strength, a high Young's modulus and excellent abrasion resistance and slipping property can be obtained as compared with a biaxially stretched film obtained by the conventional multi-stage stretching process.

BRIEF DESCRIPTION OF THE DRAWINGS

FIG. 1 is a schematic side view of an apparatus for producing a biaxially stretched film for carrying out a process for producing a polyester film according to an embodiment of the present invention.

FIG. 10 is a schematic side view of a longitudinal stretching process different from one shown in FIG. 1.

THE BEST MODE FOR CARRYING OUT THE INVENTION

Preferred embodiments of the present invention will be explained with reference to the drawings.

FIGS. 1-4 illustrate an apparatus for carrying out a process for producing a polyester film according to an embodiment of the present invention. FIG. 1 shows the entire process from a die delivering a molten sheet to a film winder of an apparatus for producing a biaxially stretched film.

Figure 2:
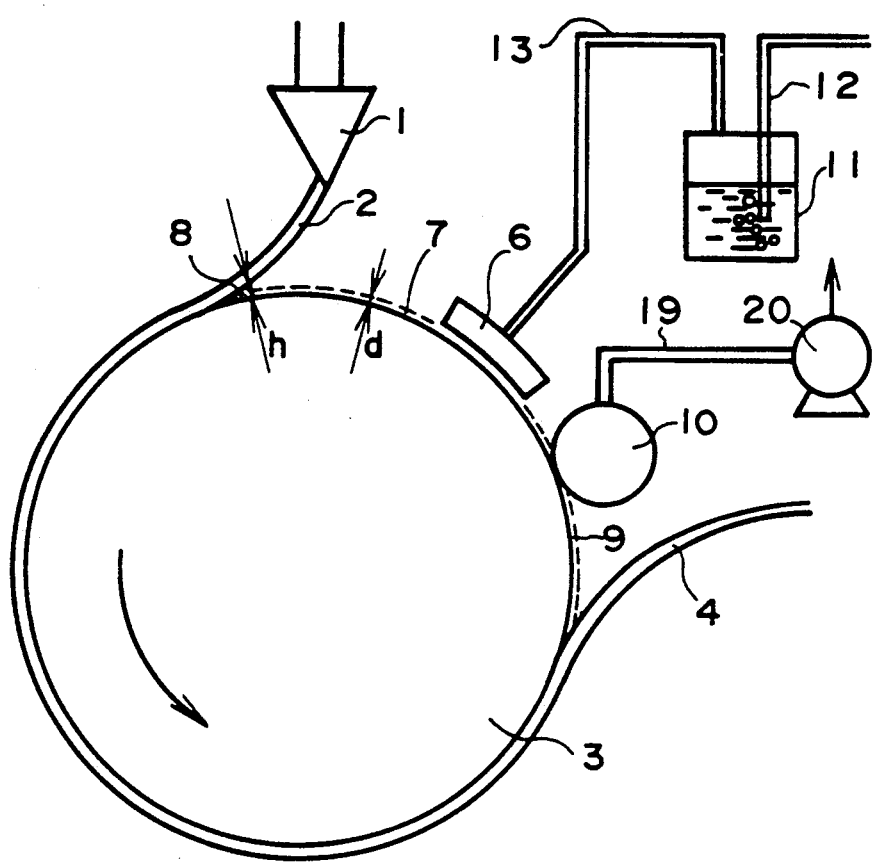
FIG. 2 is an enlarged side view of a casting process of the apparatus shown in FIG. 1.

In FIGS. 1 and 2, a molten polyester sheet 2 delivered from a die 1 as a sheet configuration is cast onto the surface of a cooling drum 3 constructed as a cooling medium in which cooling water is circulated, the cast sheet is sent in the circumferential direction of the drum together with the moving surface of the drum associated with the rotation of the drum, and the sheet is solidified by cooling on the surface of the drum. Cooled and solidified polyester sheet 4 leaves from the surface of cooling drum 3 at a position of a take-off roll 5 and is sent to a next process.

Air containing water vapor is supplied from the inside of a cover 6 which is constructed as a water supply means and opens towards the surface of cooling drum 3 to the surface of the rotating drum, and a water layer 7 constructed from many and very small water drops is formed on the surface of the drum by bedewing the water vapor on the drum surface. The average thickness of this water layer 7 is d.

Water layer 7 formed on the surface of cooling drum 3 moves together with the surface of the drum in the circumferential direction of the drum and reaches a meniscus portion 8 formed at the position where molten polyester sheet 2 comes into contact with the surface of the cooling drum. An amount of water conveyed by water layer 7 is continuously absorbed into meniscus portion 8, and the water interposed between molten polyester sheet 2 and the drum surface is continuously conveyed out from the meniscus portion as a water layer continuously extending in the transverse direction of the sheet. Since the amount of the water flown into meniscus portion 8 and the amount of the water flown out from the meniscus portion are balanced, the meniscus portion is maintained substantially to a constant configuration. The free surface of the water of meniscus portion 8 is formed as a curved surface by meniscus phenomenon, and the height h of the curved surface from the drum surface is the height of the meniscus portion.

On the surface of cooling drum 3 after cooled and solidified polyester sheet 4 leaves from the drum, a non-uniform water layer 9 remains. This water layer 9 is eliminated by an air suction roll 10 constructed as a water eliminating means. Water layer 7 with a required average thickness is formed by bedewing water vapor supplied from the inside of cover 6 on the drum surface after the remaining water is eliminated.

Figure 3:
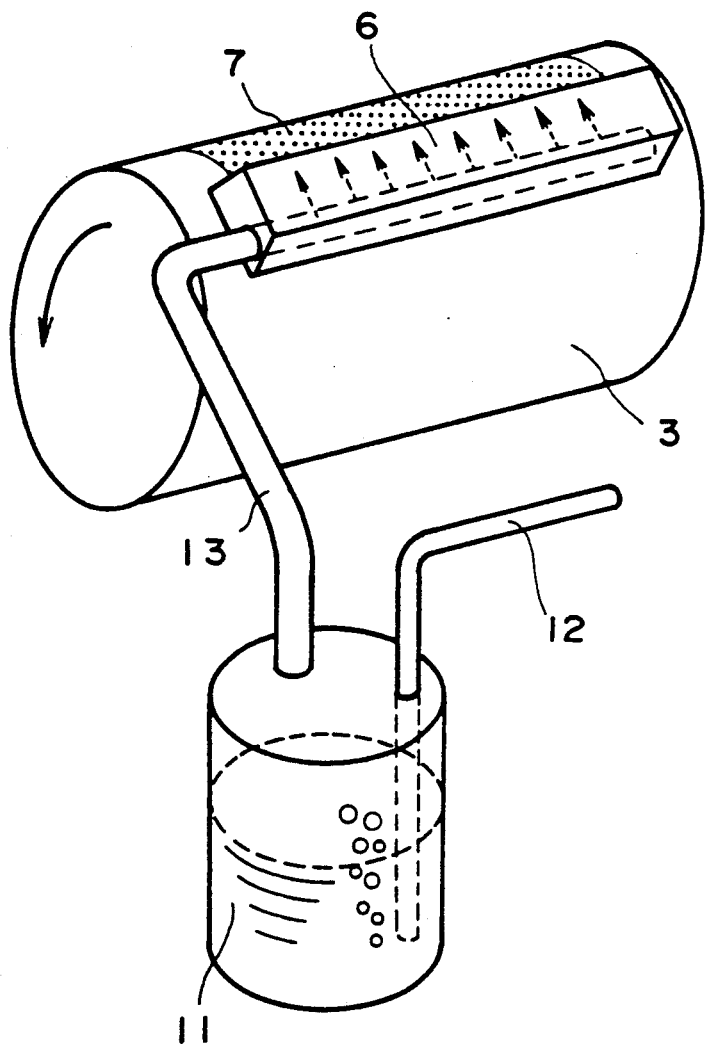
FIG. 3 is a perspective view of a water supply means shown in FIG. 2.

The water supply means is constructed in this embodiment as shown in FIG. 3. A pipe 12 is inserted into the hot water having a temperature of not higher than 100° C. and contained in a tank 11, air is supplied from an appropriate air supply means (not shown) into the hot water through the pipe and the hot water is bubbled. Much water vapor is included in the air by this bubbling, and the air containing much water vapor is introduced into cover 6 through a pipe 13. The air containing water vapor is supplied from the inside of cover 6 towards the surface of cooling drum 3 having a temperature of 20°-30° C., and the water vapor is bedewed on the drum surface as fine water drops. The water drops form water layer 7 having a required thickness.

Figure 4:
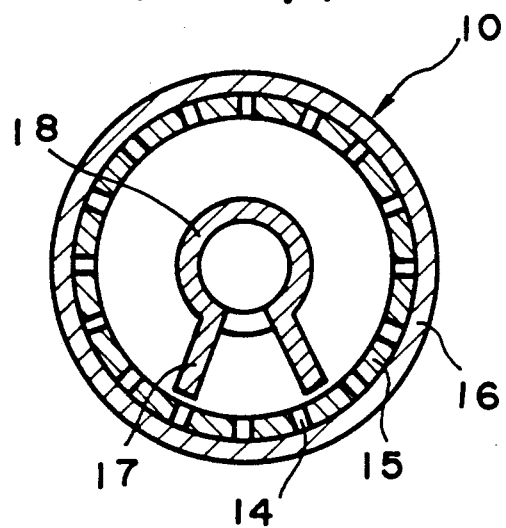
FIG. 4 is an enlarged sectional view of a water eliminating means shown in FIG. 2.

Air suction roll 10 as a water eliminating means is constructed as shown in FIG. 4. Air suction roll 10 comprises a cylindrical hollow member free to rotate and having suction holes 14, a water absorbing material 16 wrapped on the periphery of the member 15 (for example, a nonwoven fabric or a sponge) and a fixed shaft 18 having a fan-shaped guide 17 opening towards the surface of cooling drum 3. A vacuum pump 20 is connected to the end portion of fixed shaft 18 via a pipe 19, and the air inside of air suction roll 10 is sucked by the vacuum pump. The water absorbed by water absorbing material 16 is discharged together with the above sucked air.

Polyester sheet 4 cooled and solidified on the surface of cooling drum 3 is sent to a longitudinal stretching process.

Sheet 4 passes through a position between a pair of nip rolls 21 and 22, is heated to a predetermined temperature by preheating rolls 23, 24 and 25 and enters into a longitudinal stretching process 26 as shown in FIG. 1. In this embodiment, the longitudinal stretching is conducted in three zones 27, 28 and 29. The first stretching step is conducted between (a drive stretching roll 30 and a nip roll 31) and (a drive stretching roll 32 and a nip roll 33), the second stretching step is conducted between (the drive stretching roll 32 and the nip roll 33) and (a drive stretching roll 34 and a nip roll 35) and the third stretching step is conducted between (the drive stretching roll 34 and the nip roll 35) and (a drive stretching roll 36 and a nip roll 37). The total draw ratio in this three-stage longitudinal stretching is set to not less than 4.5 times the original length.

The longitudinally stretched film becomes an uniaxially stretched film 38, the film 38 passes through a cooling rolls 39 and 40 and a nip roll 41, and thereafter, the film is sent to a transverse stretching apparatus 42.

The film stretched in the transverse direction by transverse stretching apparatus 42 becomes a biaxially stretched film 43, and the film is wound as a spool by a winder 44.

Figure 5:
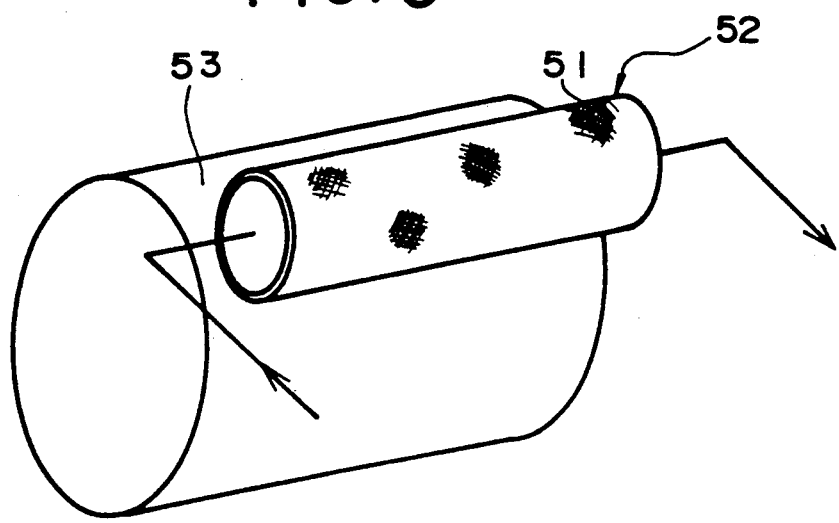
FIG. 5 is a perspective view of a water supply means different from one shown in FIG. 3.

In the above film producing apparatus, the water supply means in the casting process may be constructed of a seepage roller 52 the surface of which is covered with a water holding material 51 (for example, a nonwoven fabric or a sponge) and the water supplied from the inside of the seepage roller may be applied onto the surface of a cooling drum 53 through the water holding material, as shown in FIG. 5.

Figure 6:
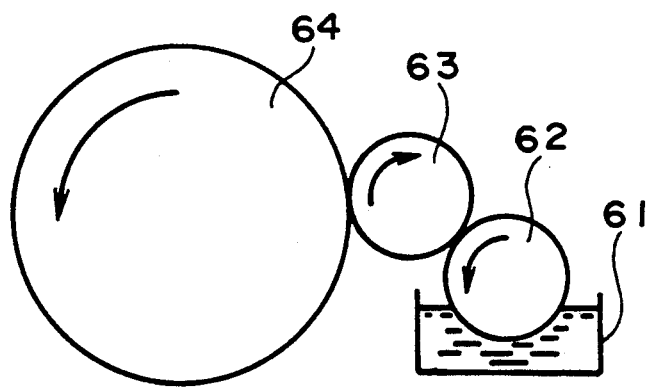
FIG. 6 is a schematic side view of a further different type water supply means.

Further, a gravure coater system may be adopted as shown in FIG. 6. In the system shown in FIG. 6, the water stored in a tank 61 is conveyed by the surface of a gravure roll 62, the conveyed water is transferred to the surface of a transfer roller 63 and the water is applied onto the surface of a cooling drum 64 from the surface of the transfer roller.

Figure 7:
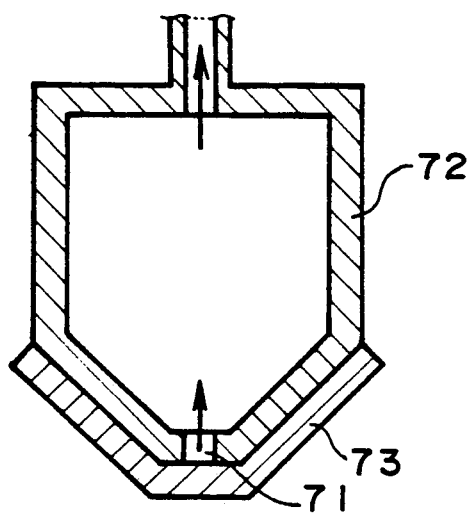
FIG. 7 is a sectional view of a water eliminating means different from one shown in FIG. 4.
Figure 8:
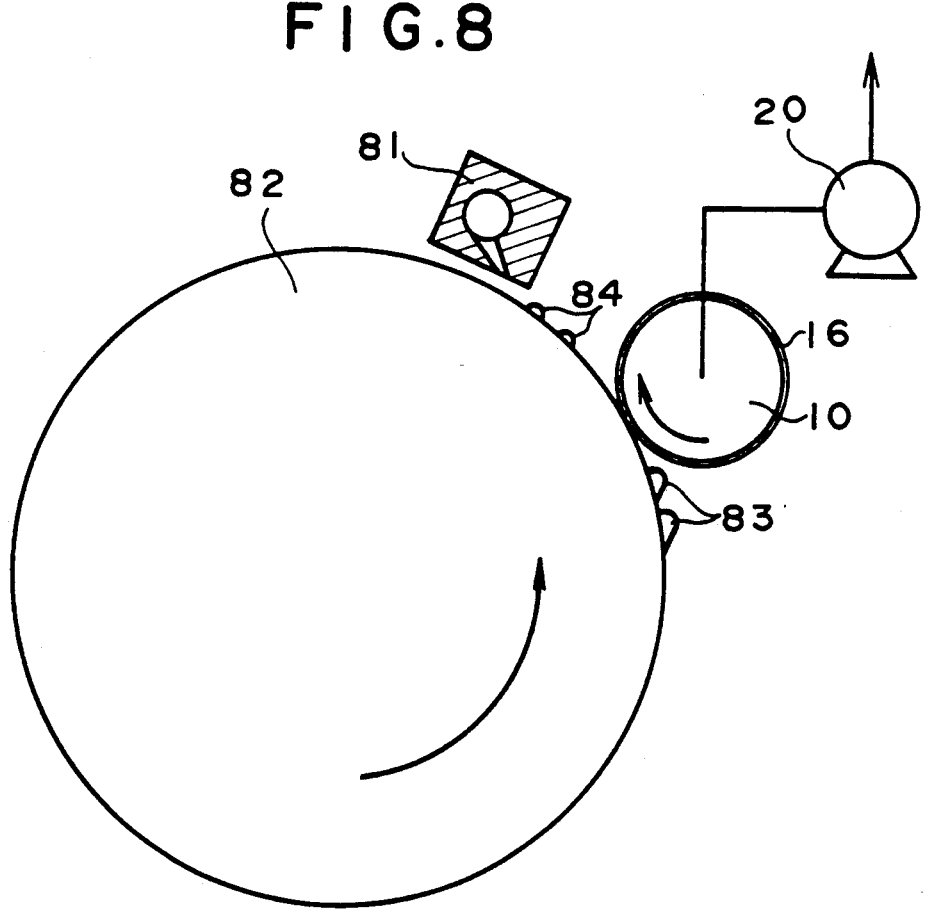
FIG. 8 is a schematic side view of a further different type water eliminating means.
Figure 9:
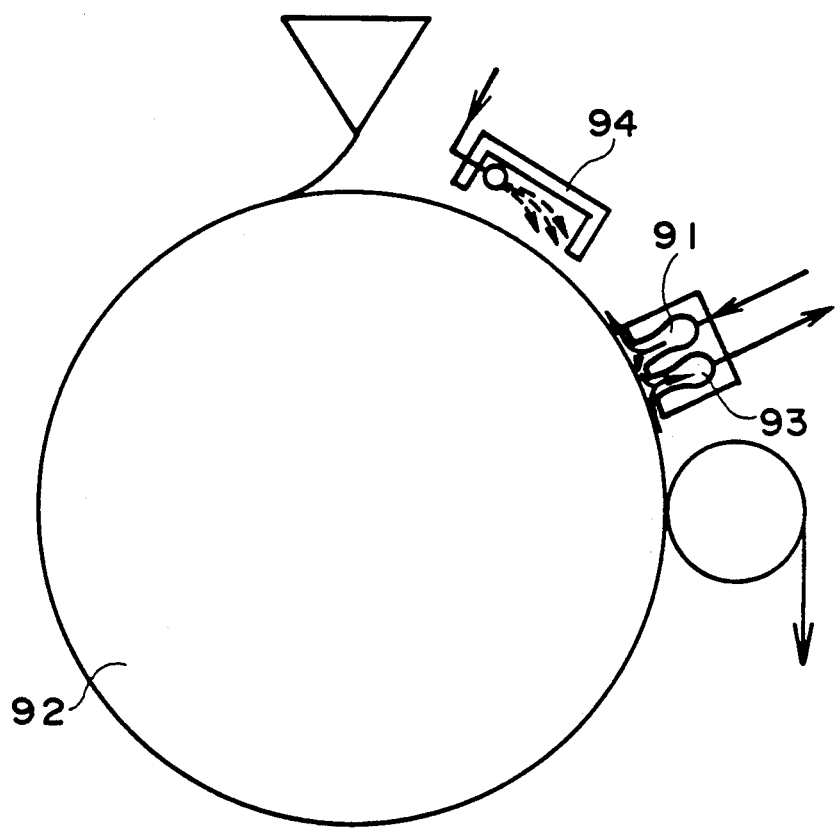
FIG. 9 is a schematic side view of a further different type water eliminating means.

A water eliminating means other than one shown in FIG. 4 may be adopted. For example, as shown in FIG. 7, a suction box 72 having a slit 71 for suction is provided, a water absorbing material 73 is attached to a portion in front of the slit, the water absorbing material is brought into contact with the surface of the cooling drum and air is sucked from the inside of the suction box. Further, air suction roll 10 shown in FIG. 4 and an air knife 81 may be combined as shown in FIG. 8. Although the most of water drops 83 remaining on the surface of a cooling drum 82 can be eliminated by air suction roll 10, a small amount of water drops 84 remains on the surface of the cooling drum because water absorbing material 16 covering the surface of the air suction roll is in a moist state. This small amount of water drops 84 is blown off or dried by air from air knife 81 and substantially the water drops can be almost completely eliminated. Furthermore, the system shown in FIG. 9 may be adopted. Air from an air knife 91 is blown to a cooling drum 92, and the water drops blown off together with the air and the water drops remaining on the drum surface are sucked by another air knife 93. In FIG. 9, air knives 91 and 93 are constructed as an integral type double air knife and a water supply means 94 has a construction similar to one shown in FIGS. 2 and 3.

As a longitudinal stretching process, a process shown in FIG. 10 may be adopted.

In the embodiment shown in FIG. 10, the longitudinal stretching is conducted by two steps consisting of a step in the first-stage stretching zone 101 where a low-speed stretching is conducted and a step in the second-stage stretching zone 102 where a stretching up to a target total draw ratio is conducted. The first-stage stretching is conducted between (a drive stretching roll 103 and a nip roll 104) and (a drive stretching roll 105 and a nip roll 106). Free rolls 107, 108 and 109 are disposed between drive stretching rolls 103 and 105, and polyester sheet 4 preheated is gradually stretched at a low stretching speed during passing through these free rolls. Rotational torque may be applied to free rolls 107, 108 and 109 by torque motors etc. without controlling respective roll speeds, and thus, the mechanical loss of each rotational free roll can be extinguished by the applied torque. The second-stage stretching is conducted between (drive stretching roll 105 and nip roll 106) and (a drive stretching roll 110 and a nip roll 111). The total draw ratio in the longitudinal stretching shown in FIG. 10 is also set to not less than 4.5 times the original length.

Next, methods for determining and estimating the characteristics in the present invention will be explained and examples and comparative examples determined and estimated in accordance with the methods will be explained.

(1) Thickness Variation

The produced film is sampled at a length of 10 m in its longitudinal direction and with the entire width in its transverse direction. The thickness of this sample is continuously determined by a strain gauge, and a value calculated by dividing the thickness difference $\Delta t$ between the maximum thickness and the minimum thickness by the average thickness t is defined as thickness variation and the thickness variation is indicated by percentage.

(2) Surface Roughness of Film

The surface roughness of a film is determined according to JIS-B-0601-1976 at a cut-off value of 0.25 mm. In this determination, the maximum roughness is Rt and the center line average height is Ra.

(3) Surface Haze

A value obtained by subtracting the internal haze determined in tetralin solution from the total haze determined according to ASTM-D-1003 (JIS-K6714) is defined as surface haze.

(4) Thickness of Water Layer

The average thickness d of a water layer is determined by infrared-absorbing analysis method. In this determination, the surface of water is covered by a sheet and the infrared ray is transmitted through the sheet. More concretely, infrared absorption hygrometer "M-300" produced by Chino Kabushiki Kaisha (a Japanese company) is used, the calibration curve between the output of the meter and the thickness of a water layer is obtained before the determination and the data are determined by the calibration curve. This calibration curve is determined as follows. First, water is bedewed on a test piece having a size of 10 cm square and constructed by plating a stainless steel plate with hard chrome (Rt=0.2 $\mu$m), a non-stretched polyester film having a thickness of 50 $\mu$m is laminated on the bedewed water, water contents are determined at ten points from the upper side of this film by the hygrometer, and the average value of the output date is determined (a). The weight of this test piece is determined by a balance (b). The weight of the test piece and the film is determined after the bedewed water is eliminated (c). The weight of the water (e) is calculated by the following equation.

$$e = b - c$$

The specific gravity of water is defined as 1.0 and the thickness of the water layer (d') is calculated from the area (100 cm$^2$) of the test piece and "e". Other data of "e" are determined by changing the condition of bedewing. The relationship between (a) and (d') are obtained, and this is defined as the calibration curve.

(5) Height of Meniscus Portion h

This is defined as a vertical height from the surface of a cooling medium of the meniscus curved surface which is formed due to the surface tension on a meniscus portion formed near a point where a molten sheet comes into contact with the surface of the cooling medium. Since the determination of "h" requires high accuracy, the photograph of the meniscus portion was taken using a fiber scope etc., and thereafter, "h" was determined from the magnified photograph.

(6) Diameter of Water Drops and Number of Water Drops

After water drops are formed on the surface of a cooling medium, a microscope is quickly set (about 30 seconds after), and after the photograph is taken, the diameter and the number of the water drops in the photograph are determined.

(7) Surface Roughness of Cooling Medium

This is determined based on JIS-B-0601-1976.

(8) Bad Formability due to Air Entrapment

A sheet on a cooling drum is observed. A case where entrapment of air can be clearly observed is defined as bad formability and shown by a mark of "x", and a case where it cannot observed is defined as good state and shown by a mark of "o".

(9) Irregularity due to Water Boiling

It is determined by visual observation whether the water on the surface of a cooling drum boils when a molten sheet comes into contact with the water and the irregularity of the sheet surface due to the boiling occurs or not.

A case where the irregularity occurs is defined as "bad" state and shown by a mark of "x", and a case where the irregularity does not occur is defined as "good" state and shown by a mark of "o".

(10) Orange Peel-like Irregularity

This is a surface defect of a sheet caused by the transfer of the shape of water drops to the surface of the sheet. A case where orange peel-like irregularity occurs on the sheet after casting and the defect can be clearly observed even in the film after biaxially stretching is defined as "unusable" state and shown by a mark of "x". A case where orange peel-like irregularity is observed in a cast sheet but it is not observed in the film after biaxially stretching is defined as "usable" state and shown by a mark of "Δ". A case where orange peel-like irregularity cannot be observed even in a cast sheet is defined as "good" state and shown by a mark of "o".

(11) Flatness

A cast sheet with its entire width is sampled by a length of 3 m and one end of the sample is attached to a shaft having a flat surface. After the sample is laid along the surface of a roll free to rotate which is spaced from the shaft by 2.5 m, the other end of the sample is loaded by 50 g/mm$^2$ so that the load is applied uniformly over the entire width of the sample.

A string is stretched over the entire width of the sheet in the horizontal direction at a central position of the sheet stretched between the shaft and the rool, namely at a position far from the shaft or the roll by 1.25 m. The string is set so as to come into contact with the sheet at least at one position. In this condition, if the sheet has a bad flatness, the bad-flatness portions of the sheet are positioned spacedly from the string in the vertical direction. This distance between the string and the surface of the sheet is determined and the grade is estimated by the following criteria. If the flatness of the sheet has no problem at all, the sheet comes into contact with the string over the entire width.

o: The distance between the sheet and the string is less than 2 mm.

Δ: The distance between the sheet and the string is not less than 2 mm and less than 10 mm.

x: The distance between the sheet and the string is not less than 10 mm.

In a case where the distance between the sheet and the string is less than 2 mm, the sheet has no problem and the estimated result thereof is shown by a mark of "o". In a case where the distance is not less than 10 mm, the sheet is not usable as a non-stretched sheet and the sheet is also unusable as a sheet for stretching because of the outbreak of wrinkles in stretching process, and therefore, the estimated result thereof is shown by a mark of "x". In a case where the distance is not less than 2 mm and less than 10 mm, the flatness of the sheet is recognized not to be good, but the sheet can be usable depending upon its usage, and therefore, the estimated result thereof is shown by a mark of "Δ".

(12) Long Term Stability

This is estimated by the period of time in which the cracking of a sheet, the slipping of the sheet or the snaking of the sheet occurs. A case where there is no problem for a term of not less than eight hours is defined as "good long term stability" state and shown by a mark of "o", and a case where there occurs any problem in a term of less than eight hours is defined as "bad long term stability" state and shown by a mark of "x".

(13) High-Speed Casting Property

A case where there is no defect in a cast sheet and no trouble in the casting property and a casting speed of not less than 80 m/min. can be achieved is defined as "good high-speed casting property" state and shown by a mark of "o", and a case where only a casting speed of less than 80m/min. can be achieved is defined as "bad high-speed casting property" state and shown by a mark of "x".

(14) Curling Up of Sheet End Portions

This is estimated by the amount of the curling up of sheet end portions during casting. The state with no curling up is shown by a mark of "⊚", the state with a curling-up amount of not greater than 1 mm is shown by a mark of "o", the state with a curling-up amount of not less than 5 mm is shown by a mark of "x" and the intermediate state is shown by a mark of "Δ". The measuring point is positioned upstream by 100 mm in the circumferential direction of the cooling medium from a position where the sheet leaves from the cooling medium.

(15) Width of Water Application in Sheet End Portion

The position of a sheet edge is defined as the reference point, and the width of water application in a sheet end portion is shown by a distance from the reference point. The direction from the reference point towards the central portion of the sheet in the transverse direction of the sheet is indicated as negative direction (−) and the direction towards the outside portion in which the sheet does not exist is indicated as positive direction (+).

EXAMPLES 1-3

Polyethylene terephthalate (ultimate viscosity in O-chlorophenol [η]; 0.65, TiO$_2$ having an average particle diameter of 300 mμ is added as an additive by 0.1 wt.%) was dried under vacuum at a temperature of 180° C. by a regular method, the dried polyethylene terephthalate was supplied to an extruder and molten therein at a temperature of 285° C., and thereafter, the molten polyethylene terephthalate was quantitatively measured by a gear pump and delivered out from a T-type die as a molten sheet having a constant thickness. The molten sheet was cooled and solidified on a cooling drum having a mirror-finish surface (the surface roughness Rt: 0.1 μm) at a casting speed of 50 m/min., while electrostatic charge was applied to the sheet over the entire width of the sheet. In this casting, air containing saturated water vapor having a temperature of 80° C. was blown to the drum surface controlled at a temperature of 25° C., and water drops were uniformly applied on the drum surface so as to form a water layer having an average thickness d of 1 μm. The height h of meniscus portion formed between the molten sheet with electrostatic charge and the cooling drum was controlled to 2.5 m.

The cast sheet thus obtained was longitudinally stretched at a draw ratio of 1.8 times via stretching rolls heated at 100° C., and thereafter, stretched at respective draw ratios of 2.6 times, 3.6 times and 4.9 times the original length via stretching rolls heated at 90° C., and thus, the sheet was longitudinally stretched by two stretching steps at a total draw ratio of 4.7 times, 6.5 times or 8.8 times the original length, respectively. Successively, the longitudinally stretched film was stretched in the transverse direction in a tenter heated at a temperature of 95° C. and heat treated at a temperature of 210° C. for 7 seconds relaxing the film therein by 5% in the transverse direction. Thus, a biaxially stretched polyester film having a thickness of 12 μm was obtained.

In this film formation, stretching with a high draw ratio was possible even in the condition of a relatively low longitudinal stretching temperature, stretching rolls were not soiled by deposited material even though the stretching is conducted for a long term, and thus stable stretching was possible. Accordingly, a very high-speed stretching could be attained as well as the stable state of stretching could be obtained. The characteristics of the film thus obtained are shown in Table 1.

When the film having the above characteristics is used for a base film of a magnetic tape, a magnetic tape having excellent running ability, slipping ability and abrasion resistance can be obtained.

forming speed after longitudinal stretching was suppressed to a low speed.

TABLE 1

|  | Casting Water Layer | Longitudinal Stretching Conditions | | | | Film Forming Speed (m/min.) | Film Characteristics | | |
|---|---|---|---|---|---|---|---|---|---|
|  |  | First Step | | Second Step | | Total Draw Ratio |  | Thickness Variation (longitudinal/ transverse) (%) | Surface Roughness Rt (μm) | Surface Haze (%) |
|  |  | Stretching Temp. (°C.) | Draw Ratio | Stretching Temp. (°C.) | Draw Ratio |  |  |  |  |  |
| Example 1 | Formed | 100 | 1.8 | 90 | 3.6 | 6.5 | 325 | 1.5/0.8 | 0.15 | 0.1 |
| Example 2 | Formed | 100 | 1.8 | 90 | 2.6 | 4.7 | 235 | 2.0/1.2 | 0.18 | 0.2 |
| Example 3 | Formed | 100 | 1.8 | 90 | 4.9 | 8.8 | 440 | 1.4/0.7 | 0.14 | 0.13 |
| Comparative Example 1 | Not formed | 100 | 1.8 | 90 | 3.6 | 6.5 | 325 | 18/25 | 1.5 | 20 |
| Comparative Example 2 | Not formed | 120 | 1.8 | 110 | 3.6 | 6.5 | 325 | 19/21 | 1.7 | 18 |
| Comparative Example 3 | Formed | 100 | 3.5 | — | — | 3.5 | 175 | 9.5/10.3 | 1.3 | 13 |

COMPARATIVE EXAMPLE 1

The biaxially stretching and heat treatment were conducted after a usual electrostatic casting method without a water layer was applied instead of the casting method with a water layer used in Examples 1-3, and other conditions were the same as in Example 1.

As a result, breakage of the film frequently occurred when the film was transversely stretched, presumably because the film was orientated too much when its longitudinal stretching. Although a stable stretching could not be achieved, the data determined on the quality of the biaxially stretched film are shown in Table 1.

COMPARATIVE EXAMPLE 2

The same casting method as in Comparative Example 1 was applied and the stretching temperature in the longitudinal stretching was controlled to a high temperature similar to the temperature in the conventional multi-stage stretching.

As a result, the stretching rolls were soiled in a short period of time, and the productivity was greatly decreased because of the cleaning of the stretching rolls. Moreover, the film adhered to the high-temperature stretching rolls when the film was stretched and the film after stretching had a rough surface.

COMPARATIVE EXAMPLE 3

The same casting condition as in Examples 1-3 was applied and the longitudinal stretching was conducted by a usual single stage stretching. Although the casting speed was the same speed as in Examples 1-3, the film Next, the resulted data of the tests in accordance with the conditions of the casting method utilizing a water layer will be explained. Firstly, the results with respect to the height h of a meniscus portion are shown in Example 4 and Comparative Example 4.

EXAMPLE 4

Polyethylene terephthalate (ultimate viscosity in O-chlorophenol[η]; 0.65, SiO₂ having an average particle diameter of 300 m μ is added as an additive by 0.1 wt.%) was used as a polymer to be molten, the polyethylene terephthalate was dried under vacuum at a temperature of 180° C. by a regular method, the dried polyethylene terephthalate was supplied to an extruder and molten therein at a temperature of 285° C., and thereafter, the molten polyethylene terephthalate was quantitatively measured by a gear pump and delivered out from a T-type die as a molten sheet having a constant thickness. The molten sheet was cooled and solidified on a cooling drum having a mirror-finish surface (the surface roughness Rt: 0.2 μm) at a casting speed of 100 m/min., while electrostatic charge was applied to the sheet over the entire width of the sheet. In this casting, air containing saturated water vapor having a temperature of 80° C. was blown to the drum surface controlled at a temperature of 25° C., and water drops were uniformly applied on the drum surface so as to form a water layer having an average thickness d of 1 μm. Thus, the molten sheet with electrostatic charge and having a thickness of 100 μm was brought into contact with the drum on which the water layer having an average thickness of 1 μm was formed, and the height h of the meniscus portion formed at their contact position was controlled to 3 μm.

Although the casting was continued for a week under such a condition, there occurred no sheet-surface defects and no sheet end portion troubles in the casting, and the sheet was cast in a stable state.

COMPARATIVE EXAMPLE 4

The height of the meniscus portion was altered by changing the position applied with electrostatic charge in Example 4 above the periphery of the cooling drum in the circumferential direction of the drum. Other conditions were the same as in Example 4, and the sheet having a resulted data are shown in Table 2.

TABLE 2

|  | Example 4 | Comparative Example 4 |
|---|---|---|
| Height of Meniscus Portion h ($\mu$m) | 3 | 0.9 |
| Average Thickness of Water Layer d ($\mu$m) | 1 | 1 |
| Obtained Sheet Surface | Good | Orange peel-like irregularity occurs |

Thus, it is understood that, when the height h of the meniscus portion is lower than the average thickness d of the water layer formed on the surface of the cooling medium, the defect of orange peel-like irregularity inevitably occurs on the surface of the cast sheet.

Next, the conditions for forming a water layer by bedewing method were examined.

EXAMPLES 5-7, COMPARATIVE EXAMPLES 5-7

The same polyethylene terephthalate as in Example 4 was used, it was dried under vacuum at a temperature of 180° C., supplied to an extruder and molten at a temperature of 285° C., a molten sheet was delivered out from a T-type die, and electrostatic charge was applied to the sheet over the entire width of the sheet. Air with moisture shown in Table 3 was sent onto a cooling drum (chrome-plated roll) shown in Table 3, a water layer formed by water drops shown in Table 3 was formed, and the sheet having a thickness of 100 $\mu$m was cast on the cooling drum at a speed of 90 m/min.

The water eliminating roll shown in FIG. 2 was attached between the position where the sheet left from the drum and the position where air with moisture was blown, the roll was pressed onto the cooling drum with a pressure of 0.8 kg/cm, and surplus water was eliminated via a vacuum pump having a capacity of 500 l/m².min.

This cast sheet was sent to a regular biaxially stretching apparatus to stretch the sheet with one stretching step in the longitudinal direction and stretch the film with one stretching step in the transverse direction. The biaxially stretched film was thus obtained. The casting conditions was estimated from both of the cast sheet and the biaxially stretched film. The resulted data are shown in Table 3.

As a result, a film without the forming defect due to the entrapment of air, the irregularity of the film surface due to the boiling of water and orange peel-like irregularity could be obtained by bedewing water drops having a specific configuration on a cooling drum having a specific surface roughness, even if the casting was conducted at a high speed.

TABLE 3

| | Conditions of Cooling Drum | | Conditions of Moist Air | | Shape of Water Drop | | Defects of Film and Sheet | | |
|---|---|---|---|---|---|---|---|---|---|
| | Surface Temp. (°C.) | Surface Roughness Ra ($\mu$m) | Temp. (°C.) | Amount of Air (l/min.) | Maximum Diameter of Drops ($\mu$m) | Number of Water Drops (Number/0.1 mm²) | Forming Defect due to Air Entrapment | Irregularity due to Water Boiling | Orange Peel-like Irregularity |
| Comparative Example 5 | 25 | 0.047 | 80 | 50 | 95 | 52 | ○ | × | × |
| Example 5 | 25 | 0.038 | 80 | 50 | 69 | 55 | ○ | ○ | △ |
| Example 6 | 20 | 0.024 | 70 | 40 | 20 | 100 | ○ | ○ | ○ |
| Example 7 | 15 | 0.010 | 70 | 30 | 10 | 480 | ○ | ○ | ○ |
| Comparative Example 6 | 20 | 0.024 | 80 | 500 | 85 | 530 | ○ | × | × |
| Comparative Example 7 | 20 | 0.024 | 70 | 5 | 5 | 42 | × | ○ | ○ |

Next, in the casting method for interposing a water layer, the effect according to enlarging the thickness of the water layer at the sheet end portions and the effect according to cooling the anti-cooling drum-side surface of the sheet at the sheet end portions were investigated.

EXAMPLES 8-11, COMPARATIVE EXAMPLES 8-11,

Polyethylene terephthalate (IV=0.65) was dried under vacuum at a temperature of 180° C., supplied to an extruder and molten at a temperature of 290° C., a molten sheet was delivered out from a T-type die, and electrostatic charge was applied to the sheet over the entire width of the sheet. The sheet having a thickness of 50 $\mu$m was continuously cast onto a cooling drum having a surface roughness Rt of 0.2 $\mu$m under the casting conditions of respective casting speeds of 30, 70 and 100 m/min. for 24 hours, as shown in Table 4.

The water layer was formed by bedewing method and the thickness of the water layer was controlled by the amount of sent moist air. The bedewing apparatus for the central portion of the sheet and that for the sheet end portions were different from each other. The water eliminating roll shown in FIG. 2 was attached, a pressure of 0.7 kg/cm was applied to the roll and surplus water was eliminated via a vacuum pump having a capacity of 500 l/m².min.

For cooling of the anti-cooling drum-side surface of the sheet at the sheet end portions, nozzles having a slit width of 0.2 mm and a length of 30 mm, in a state that the longitudinal direction of each nozzle was set to the transverse direction of the sheet, were arranged by 15 in number in the sheet running direction, and the amount of the water supplied from the nozzles was controlled to prevent the water layer formed the supplied water from breaking.

As is evident from the result shown in Table 4, it is understood that a cast sheet with an excellent flatness and less curling up of the sheet end portions can be obtained by specifying the distribution of the thickness of the water layer in the transverse direction of the sheet, and casting stable for a long term and high-speed casting can be possible.

TABLE 4

| | Casting Conditions | | | | Characteristics of Cast Sheet | | Casting Properties | |
|---|---|---|---|---|---|---|---|---|
| | Conditions of Water Application | | | Cooling of Anti-Drum Surface of Sheet End Portions | | | | |
| | Thickness of Water Layer in Central Portion (μm) | Thickness of Water Layer in Sheet End Portions (μm) | Width of Water Application in Sheet End Portions (mm) | | Flatness | Curling up of Sheet End Portions | Long Term Stability | High-Speed Casting Property |
| Comparative Example 8 | 0 | 0 | — | Not conducted | ○ | ○ | ○ | × |
| Comparative Example 9 | 1.0 | 1.0 | +10--100 | Not conducted | × | × | × | ○ |
| Example 8 | 1.0 | 1.5 | +10--100 | Not conducted | ○ | ○ | ○ | ○ |
| Example 9 | 2.7 | 3.7 | +10--100 | Not conducted | ○ | ○ | ○ | ○ |
| Example 10 | 2.7 | 3.7 | +10--100 | Conducted | ○ | ⊙ | ○ | ○ |
| Comparative Example 10 | 3.5 | 4.0 | +10--100 | Not conducted | × | ○ | × | ○ |
| Comparative Example 11 | 0.05 | 0.7 | +10--100 | Not conducted | × | ○ | × | × |
| Example 11 | 0.2 | 4.5 | +10--100 | Not conducted | ○ | ○ | ○ | ○ |

INDUSTRIAL APPLICATIONS FOR THE INVENTION

As explained hereinabove, in the process for producing a polyester film according to the present invention, since the film can be formed stably and at a high speed and the film having good transparency, less surface roughness and excellent abrasion resistance can be obtained, the process is very useful for producing a polyester film for magnetic materials, electrically insulating materials, capacitors, other industrial materials and wrapping materials.

What is claimed is:

1. A process for producing a polyester film comprising solidifying a molten polyester sheet by cooling it on the surface of a mobile cooling medium on which a water layer is formed, said water layer formed on the surface of said mobile cooling medium at a position immediately ahead of the position where said molten polyester sheet comes into contact with the surface of said mobile cooling medium and having an average thickness d, wherein a meniscus portion formed at the position where said molten polyester sheet comes into contact with the surface of said mobile cooling medium has a height h from the surface of said mobile cooling medium such that h>d; the sheet is then stretched at a total draw ratio of at least 4.5 times the original length in a longitudinal direction through a plurality of stretching steps.

2. The process according to claim 1, wherein said molten polyester sheet is solidified by cooling it on the surface of said mobile cooling medium while electrostatic charge is applied to said molten polyester sheet.

3. The process according to claim 1, wherein side portions of said water layer are formed thicker than the central portion in the transverse direction of said molten polyester sheet.

4. The process according to claim 1, wherein the anti-cooling medium-side surface of said molten polyester sheet is cooled at its end portions in the transverse direction of said sheet by a cooling means other than said mobile cooling medium.

5. The process according to claim 1, wherein said water layer is formed by a method for bedewing water vapor on the surface of said mobile cooling medium.

6. The process according to claim 5, wherein the maximum diameter of dew drops formed on the surface of said mobile cooling medium by said bedewing method is not greater than 70 μ.

7. The process according to claim 5, wherein the density of dew drops formed on the surface of said mobile cooling medium by said bedewing method is not less than 50/0.1 mm² in number.

8. The process according to claim 1, wherein water for forming said water layer is supplied onto the surface of said mobile cooling medium by a water supply means after residual water on the surface of said mobile cooling medium is eliminated by a water eliminating means at a position between the position where the polyester sheet solidified by cooling on the surface of said mobile cooling medium leaves from the surface of said mobile cooling medium and the position where said molten polyester sheet comes into contact with the surface of said mobile cooling medium.

9. The process according to claim 1, wherein the center line average height Ra of the surface roughness of said mobile cooling medium is not greater than 0.4 μm.

10. The process according to claim 1, wherein the draw ratio of each stretching step of said plurality of stretching steps in the longitudinal direction is at least 1.1 times.

11. The process according to claim 1, wherein, in said plurality of stretching steps in the longitudinal direction, the draw ratio of a stretching step at a downstream position in a sheet running direction is greater than that of a stretching step at an upstream position in the sheet running direction.

12. The process according to claim 1, wherein each stretching step of said plurality of stretching steps in the longitudinal direction is conducted between an upstream drive stretching roll and a downstream drive stretching roll which are disposed adjacent to each other in a sheet running direction.

13. The process according to claim 1, wherein, in said plurality of stretching steps in the longitudinal direction, a final stretching step is conducted between an upstream drive stretching roll and a downstream drive stretching roll which are disposed adjacent to each other in a sheet running direction, and stretching steps upstream of said final stretching step in the sheet running direction are conducted between an upstream drive stretching roll and a downstream drive stretching roll, which are disposed in the sheet running direction, via free stretching rolls which are disposed between the drive stretching rolls.

* * * * *